United States Patent
Beach et al.

(10) Patent No.: US 8,204,039 B2
(45) Date of Patent: Jun. 19, 2012

(54) SYSTEM AND METHOD FOR DATA COMMUNICATION IN A WIRELESS NETWORK

(75) Inventors: Robert Beach, Los Altos, CA (US); Dean Kawaguchi, San Jose, CA (US); Ramesh Sekhar, San Jose, CA (US)

(73) Assignee: Symbol Technologies, Inc., Holtsville ( * ) Notice: Subject to any disclaimer, the term of this patent is extended or adjusted under 35 U.S.C. 154(b) by 472 days.

(21) Appl. No.: 11/290,920

(22) Filed: Nov. 30, 2005

(65) Prior Publication Data

US 2007/0121558 A1    May 31, 2007

(51) Int. Cl.
H04W 4/00 (2009.01)
H04L 12/28 (2006.01)
H04W 40/00 (2009.01)
H04B 7/00 (2006.01)

(52) U.S. Cl. ........ 370/351; 370/358; 370/238; 455/445; 455/422.1; 455/41.2

(58) Field of Classification Search ................. 455/41.2, 455/41.3, 422.1, 445; 370/237, 238, 351, 370/328
See application file for complete search history.

(56) References Cited

U.S. PATENT DOCUMENTS

| | | | |
|---|---|---|---|
| 5,548,646 A * | 8/1996 | Aziz et al. | 713/153 |
| 5,960,344 A * | 9/1999 | Mahany | 455/432.2 |
| 6,624,750 B1 | 9/2003 | Marman et al. | |
| 6,763,007 B1 * | 7/2004 | La Porta et al. | 370/331 |
| 6,985,960 B2 * | 1/2006 | Takashima et al. | 709/238 |
| 7,024,557 B1 * | 4/2006 | Moles et al. | 713/170 |
| 7,505,450 B2 * | 3/2009 | Castagnoli | 370/350 |
| 7,586,897 B2 * | 9/2009 | Ruffino et al. | 370/351 |
| 8,036,224 B2 * | 10/2011 | Axelsson et al. | 370/395.21 |
| 2002/0068584 A1 * | 6/2002 | Gage et al. | 455/456 |
| 2002/0197984 A1 * | 12/2002 | Monin et al. | 455/419 |
| 2003/0060202 A1 * | 3/2003 | Roberts | 455/445 |
| 2004/0058683 A1 * | 3/2004 | Okagawa et al. | 455/445 |
| 2004/0213167 A1 * | 10/2004 | Garcia-Luna-Aceves et al. | 370/254 |
| 2004/0264435 A1 * | 12/2004 | Chari et al. | 370/351 |
| 2004/0264503 A1 * | 12/2004 | Draves, Jr. | 370/469 |
| 2005/0232179 A1 * | 10/2005 | daCosta et al. | 370/315 |
| 2007/0040747 A1 * | 2/2007 | Kinezos | 343/700 MS |
| 2007/0104107 A1 * | 5/2007 | Alapuranen | 370/238 |
| 2008/0107052 A1 * | 5/2008 | Vogety et al. | 370/310 |

OTHER PUBLICATIONS

Manoj et al., "Multi-hop cellular networks: Architecture and protocols for best-effort and real-time communication", Journal of Parallel and Distributed Computing, vol. 65, Apr. 12, 2005, pp. 767-791.

Li et al., "Comparison of Ad Hoc and Centralized Multihop Routing", IEEE, vol. 2, Oct. 27, 2002, pp. 791-795.

(Continued)

Primary Examiner — Wesley Kim

(57) ABSTRACT

Described is a system comprising a first wireless device and a second wireless device. The first device has access to a packet routing table which includes data indicative of a packet transmission path in a wireless mesh communications network. The second wireless device is communicatively coupled to the first device and has access to the routing table. Upon receipt of a packet by the first device which is addressed to the second device, the first device determines, as a function of at least one of (i) the routing table and (ii) a first identifier of the second device, a second identifier of a third wireless device to receive the packet directly from the first device. At least one of the first, second and third devices updates the routing table.

21 Claims, 4 Drawing Sheets

OTHER PUBLICATIONS

Raniwala et al., "Centralized Channel Assignment and Routing Algorithms for Multi-Channel Wireless Mesh Networks", Mobile Computing and Communications Review, vol. 8, No. 2, Apr. 2004, pp. 50-65.

Hui Li et al: "Comparison of ad hoc and centralized multihop routing" Wireless Personal Multimedia Communications, 2002. The 5th International Symposium on Oct. 27-30, 2002, Piscataway, NJ, USA,IEEE, vol. 2, Oct. 27, 2002, pp. 791-795, XP010619198 ISBN: 0-7803-7442-8.

Raniwala A et al: "Centralized Channel Assignment and Routing Algorithms for Multi-Channel Wireless Mesh Networks" Mobile Computing and Communications Review, ACM, New York, NY, US, vol. 8, No. 2, Apr. 2004, pp. 50-65, XP002406238 ISSN: 1091-1669.

China Application No. 200680044640.6 First Office Action dated Jul. 14, 2010, corresponding to U.S. Appl. No. 11/290,920, a foreign counterpart.

EPO Rejection to corresponding European Application No. 06838330.6-1525 dated May 13, 2011.

A.S. Tanenbaum: "Computer Networks", Fourth Edition, Aug. 26. 2003, pp. 772-00776.

PCT/US2006/045306—International Search Report, Mailing Date Aug. 8 2007—5 pages.

PCT/US2006/045306—International Preliminary Report on Patentability with Written Opinion, mailing date Jun. 12, 2008—13 pages.

Manoj B S et al: "Multi-hop cellular networks: Architecture and protocols for best-effort and real-time communication" Journal Of Parallel And Distributed Computing, Elsevier, Amsterdam, NL, vol. 65, No. 6, Jun. 2005, pp. 767-791, XP004872453 ISSN: 0743-7315.

Hui Li et al: "Comparison of ad hoc and centralized multihop routing" Wireless Personal Multimedia Communications, 2002. The 5TH International Symposium On Oct. 27-30, 2002, Piscataway, NJ, USA, IEEE, vol. 2, Oct. 27, 2002, pp. 791-795, XP010619198 ISBN: 0/7803-7442-8.

Raniwala A et al: "Centralized Channel Assignment and Routing Algorithms for Multi-Channel Wireless Mesh Networks" Mobile Computing And Communications Review, ACM, New York, NY, US, vol. 8, No. 2, Apr. 2004, pp. 50-65, XP002406238. ISSN: 1091-1669.

EPC Action Report mailed Feb. 2, 2010—3 pages.

Corresponding Chinese Application No. 2006800446640.6—Second Office Action mailed Dec. 21, 2011.

* cited by examiner

| Received From | Transmit To | Interface |
|---|---|---|
| Switch 15 | AP 35 | Radio 1 - 2.4 GHz |
| AP 25 | ... | ... |

205, 210, 215

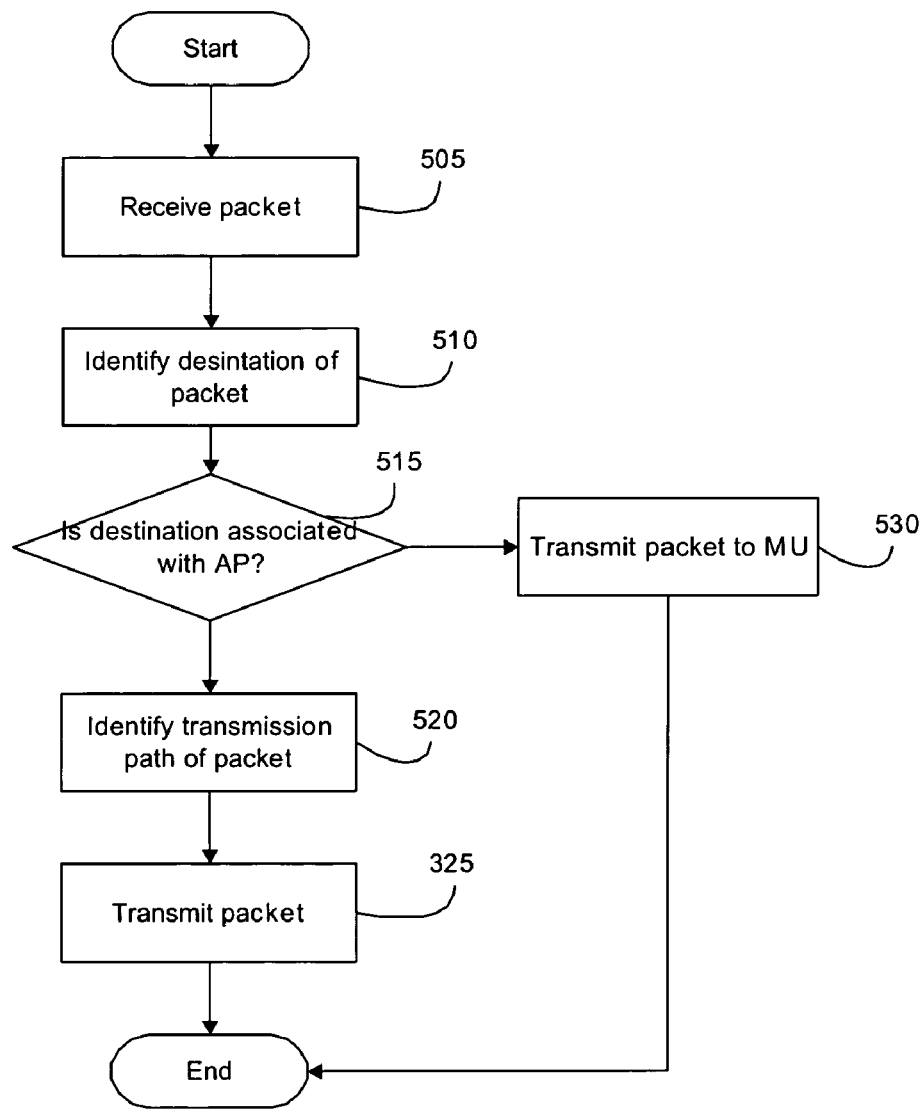

SYSTEM AND METHOD FOR DATA COMMUNICATION IN A WIRELESS NETWORK

BACKGROUND

In a conventional wireless mesh network, each node (e.g., an access point/port ("AP")) may function as a router and an end point. That is, the node may transfer a packet between two further nodes, and/or may function as the end point by transmitting the packet to a client (e.g., a mobile unit ("MU")) associated therewith. In determining whether the node will transfer the packet to the further node or transmit the packet to the client, the node decrypts the packet to identify a destination for the packet. The node then utilizes a spanning tree to determine a routing for the packet based on the destination. Each node in the mesh network generates and utilizes a unique spanning tree for routing the packet.

Encrypting and decrypting the packet requires additional CPU cycles and increasing a speed of the CPU which draws a significant amount of power from the node. This is a noted disadvantage for nodes deployed in outdoor spaces (e.g., parking lots, shipping yards). These nodes are typically positioned on lightpoles and are powered by a line voltage supplied thereto. Alternatively, the node may utilize a battery for power, but the encryption/decryption of packets will quickly drain the battery, limiting a usefulness of the node.

SUMMARY OF THE INVENTION

The present invention relates to a system comprising a first wireless device and a second wireless device. The first device has access to a packet routing table which includes data indicative of a packet transmission path in a wireless mesh communications network. The second wireless device is communicatively coupled to the first device and has access to the routing table. Upon receipt of a packet by the first device which is addressed to the second device, the first device determines, as a function of at least one of (i) the routing table and (ii) a first identifier of the second device, a second identifier of a third wireless device to receive the packet directly from the first device. At least one of the first, second and third devices updates the routing table.

BRIEF DESCRIPTION OF THE DRAWINGS

FIG. 5 shows an exemplary embodiment of a further method according to the present invention.

DETAILED DESCRIPTION

Figure 1:
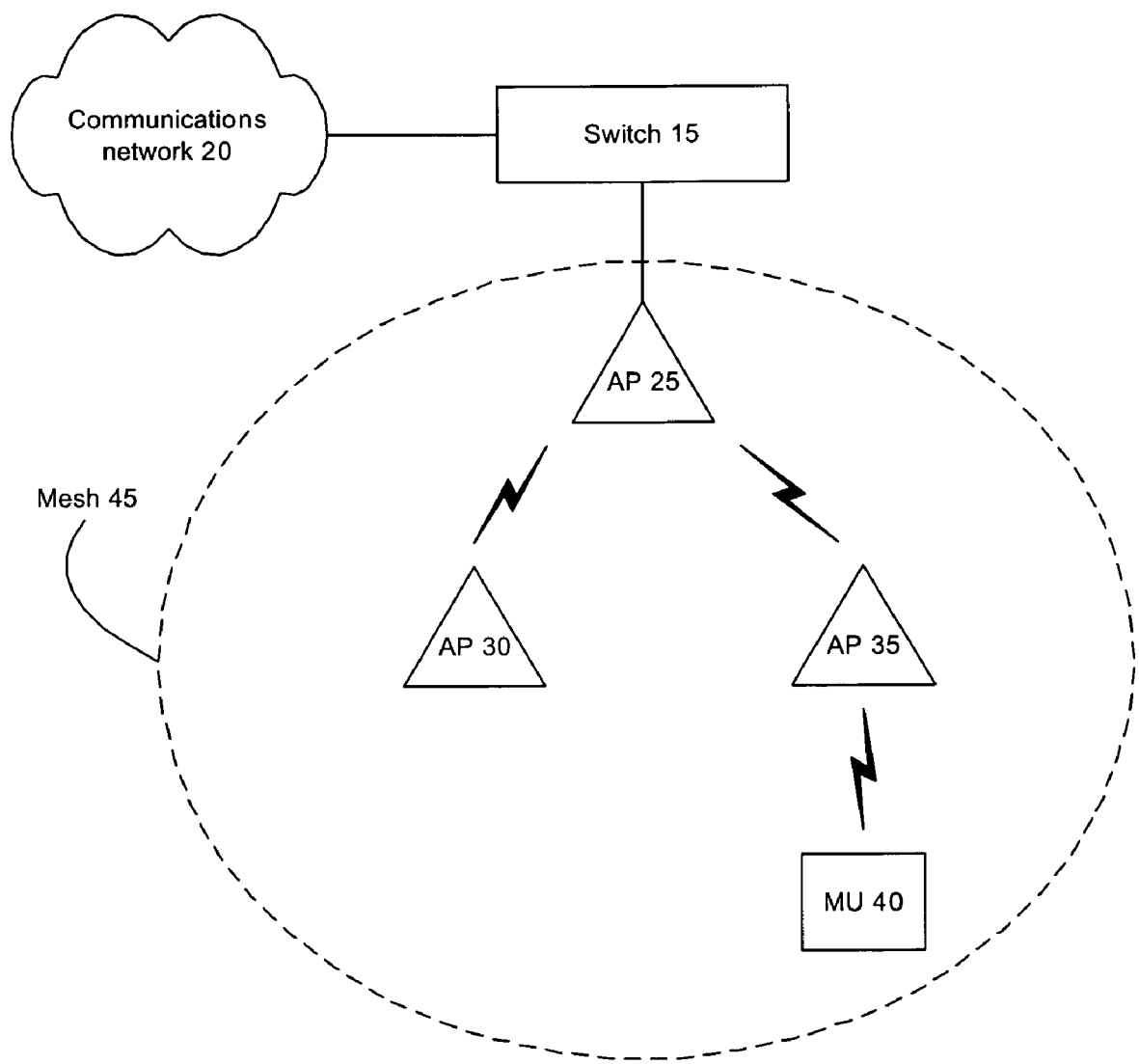
FIG. 1 shows an exemplary embodiment of a system according to the present invention.

The present invention may be further understood with reference to the following description and the appended drawings, wherein like elements are referred to with the same reference numerals. The present invention describes a system and a method for data transfer in a wireless network. Although, the present invention will be described with respect to a mesh network, those of skill in the art will understand the present invention may be implemented in any wired or wireless network and/or subnetwork. For example, the mesh network may be deployed and/or configured as a subnetwork of a wireless local area network. The system and method of the present invention may be provided with or provide further functionality for U.S. patent application Ser. No. 09/528,697, entitled "Wireless Local Area Networks" filed Mar. 17, 2000, and U.S. patent application Ser. No. 09/457,724, entitled "Flexible Wireless LAN Architecture Based On Wireless Communication Server" filed Dec. 8, 1999, the disclosures of which are expressly incorporated herein by reference.

FIG. 1 shows an exemplary embodiment of a system 10 according to the present invention. The system 10 may include a network management arrangement (e.g., a switch 15) coupled to a communications network 20 and an access point ("AP") 25. The network 20 may be any wired and/or wireless local/wide area network, Intranet, Internet, etc. The AP 25 may communicate with APs 30 and 35 according to a predetermined wireless communication protocol (e.g., 802.11) using radio frequency ("RF") signals. Each of the APs 25, 30 and 35 may communicate with a mobile or stationary computing device which includes or is coupled to a wireless transceiver (e.g., a mobile unit ("MU") 40). The MU 40 may include, for example, a cell phone, a laptop, a network interface card, a laser-based scanner, an image-based scanner, an RFID reader, etc. Those of skill in the art will understand that the system 10 may include any number of APs and MUs.

In one embodiment, the AP 25 communicates with the switch 15 via a wired connection and communicates with the APs 30 and 35 via wireless connections (e.g., an RF channel). In this manner, the AP 25 may function as a root node within a wireless mesh 45. The mesh 45 may include the APs 30 and 35, and any other device (e.g., AP, MU) functioning as a node therein. Thus, any signal from any node within the mesh 45 which is intended for the network 20 may be received by the AP 25 and transmitted to the network 20 via the switch 15. Those of skill in the art will understand that the mesh 45 may include a full mesh (e.g., each node is coupled to every further node in the mesh) or a partial mesh (e.g., some nodes may be organized as the full mesh, but others may be coupled to only one or two further nodes). Those of skill in the art will further understand that the switch 15 may support connections to one or more further root nodes.

Those of skill in the art will understand that APs may be added/removed from the mesh 45 during operation. For example, when a new AP is deployed, it may listen for beacons from surrounding APs and attempt association with a selected AP.

Figures 2, 4:
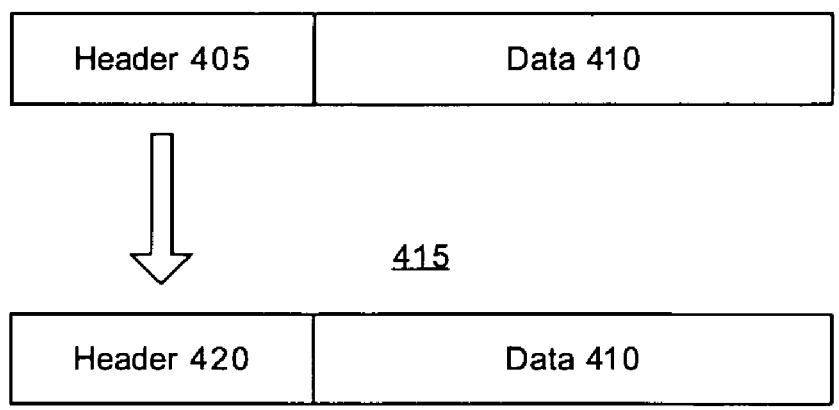
FIG. 2 shows an exemplary embodiment of a routing table according to the present invention.
FIG. 4 shows an exemplary embodiment of a packet according to the present invention.

According to the present invention, the switch 15 may generate and update a routing table 200, shown in FIG. 2, as the mesh 45 is deployed and/or modified (e.g., APs added, removed, malfunctioned, etc.). The routing table 200 may include addressing data for determining a transmission path of a packet transmitted through the mesh 45 in any direction (e.g., upstream, or downstream). Those of skill in the art will understand that the routing table 200 may be stored or configured as any data structure including, but is not limited to, a table, a queue, a linked list, a stack, etc.

In one exemplary embodiment, the routing table 200 includes a first field (e.g., a "received-from" field) 205 and a second field (e.g., a "transmit-to" field) 210. The first field 205 may include a first identifier indicating the AP from which the packet was received. The second field 210 may include a second identifier indicating the AP to which the packet should be transmitted. Thus, when the AP (e.g., the AP 25) receives the packet, it utilizes the routing table 200 for forwarding the packet to a further AP (e.g., AP 30, AP 35).

Optionally, the routing table 200 may include a third field (e.g., an interface field) 215 which includes a third identifier indicating an interface (e.g., a radio) for transmitting the packet. For example, the AP 25 may utilize one or more radios which transmit on one or more bands (e.g., 2.4 GHz and 5.1 GHz). Thus, the third field 215 may instruct the AP 25 to utilize a preselected radio. The switch 15 may utilize the routing table 200 to provide increased throughput and data rates within the mesh 45. The routing table 200 may also provide an increased amount of bandwidth to an endpoint (e.g., the MU 40). According to the present invention, the switch 15 transmits (i.e., downloads) the routing table 200 to all of the APs in the mesh 45. Thus, when the AP 35 receives the packet, it may forward the packet utilizing the routing table 200, as will be described further below. Those of skill in the art will understand that the switch 15 may transmit the routing table 200 at predetermined intervals (e.g., time-based) and/or after each update thereof. In another embodiment, the routing table 200 may be transmitted only to a predetermined number of APs, because the update of the routing table 200 only had an effect thereon.

Figure 3:
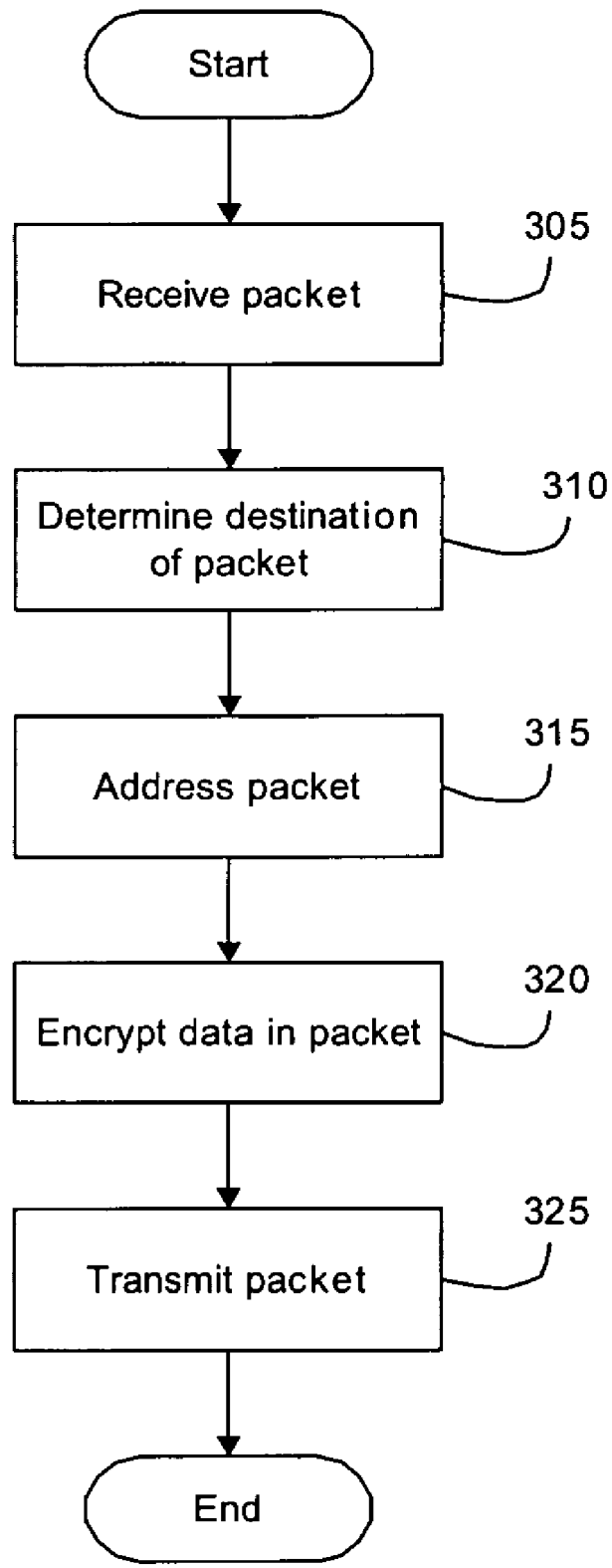
FIG. 3 shows an exemplary embodiment of a method according to the present invention.

FIG. 3 shows an exemplary embodiment of a method 300 according to the present invention. In step 305, the switch 15 receives a packet from the network 20. As understood by those of skill in the art, the packet may be transmitted over the network 20 utilizing a wired communication protocol (e.g., TCP/IP), and optionally, encrypted with a wired encryption protocol (e.g., IPSec). Thus, upon receipt, the switch 15 may decrypt the packet using the wired encryption protocol. Although, the method 300 will be described with reference to the packet being transmitted downstream, those of skill in the art will understand that the method 300 similarly applies to transmissions upstream and between nodes within the mesh 45 (e.g., between the APs 30 and 35).

In step 310, the switch 15 determines a destination of the packet. For example, the destination of the packet may be the MU 40. As understood by those of skill in the art, the destination may be identified by a destination identifier (e.g., a MAC address, an IP address, a BSSID, etc.) which is included in the packet.

In step 315, the switch 15 addresses the packet for transmission to the destination (e.g., the MU 40). According to the present invention, the switch 15 may modify the packet to prepare it for transmission within a wireless network, and in particular, within the mesh 45. That is, the packet may be formatted in accordance with a wireless communication protocol (e.g., 802.11).

In one embodiment, the packet may be re-formatted for the wireless communication protocol as shown in FIG. 4. The packet may be received from the network 20 as a first packet 400. That is, the first packet 400 may be transmitted (and formatted) according to the wired communication protocol. Accordingly, the first packet 400 may include a header 405 (e.g., an Ethernet header) which may be followed by a data portion 410. The header 405 may include the destination identifier for the destination (e.g., the MU 40) as well as further data indicative of, for example, a source identifier of a source of the first packet 400, an intermediate identifier of a network device (e.g., further switch, router, hub, PC, server, etc.) which transmitted the first packet 400 to the switch 15, etc. The data portion 410 may include any information (e.g., voice, data, video, management, etc.) which may be transmitted within a data sharing network.

Upon receipt of the first packet 400, the switch 15 determines the destination thereof, which may include decryption of the first packet 400. In one embodiment, when the destination has been determined, the switch 15 may generate a second packet 415 which may be configured (and formatted) for transmission according to the wireless communication protocol. Thus, the second packet 415 may include a header 420 (e.g., an 802.11 header) which is formatted according to the wireless communication protocol. The data portion 410 may remain unchanged. In another embodiment, the switch 15 does not generate the second packet 415 as an entirely new packet, but may replace the header 405 of the first packet 400 with a header 415. That is, the second packet 415 may simply be the first packet 400 with the header 415 in place of the header 405. Similarly, the data portion 410 remains unchanged in the second packet 415. Because the data portion 410 remains unchanged in the first and second packets, the second packet which is transmitted by the switch 15 to the mesh 45 will be referred to below as "the packet."

The second header 410 may include a plurality of address fields for routing the packet within the wireless network (e.g., the mesh 45). That is, while the wired communication protocol typically utilizes two address fields (e.g., source and destination) in the first header 405, the wireless communication protocol may utilize four address fields in the second header 420. A first address field (e.g., a "next hop") may include a first address of the AP which may receive the packet immediately after a present location of the packet. A second address field (e.g., a "source hop") may include a second address of the AP which is the present location of the packet. A third address field (e.g., a "remote destination") may include a third address of the destination of the packet, in this example, the MU 40. A fourth address field (e.g., a "remote source") may include a fourth address of a source of the packet. For example, with reference to FIG. 1, when the packet is at the AP 25, the first address field may identify the AP 35, and the second address field may identify the AP 25. The third address field may identify the MU 40, and the fourth address field may identify the source of the packet. Those of skill in the art will understand that the first and second address fields may be modified during communication of the packet within the mesh 45 (e.g., from AP to AP), but the third and fourth address fields may remain unchanged.

When the switch 15 addresses the packet for the MU 40, the data in the first and second address fields of the header 420 may be modified. That is, when the packet is at the switch 15, the first address field identifies the AP 25, and the second address field identifies the switch 15. Those of skill in the art will understand that all packets transmitted between the switch 15 and the AP 25 may have same addresses in the first and second address fields, because, as described above, the AP 25 may be the root node of the mesh 45, whereby all packets from the mesh 45 which are bound for the network 20 may be funneled through the AP 25.

In step 320, the switch 15 encrypts the data portion 410 of the packet. Thus, the second header 410 may remain unencrypted, while the packet is being transmitted to the AP 25 and through the mesh 45. In one embodiment, the switch 15 encrypts the data portion 410 using the wired encryption protocol described above, because the packet may be transmitted over the wired connection to the AP 25 prior to being transmitted over the RF channel in the mesh 45. In another embodiment, the encryption may be performed using a wireless encryption protocol (e.g., WEP, WPA, WPA2) so that when the MU 40 receives the packet, the data portion 410 may be decrypted.

In step 325, the switch 15 transmits the packet to the AP 25. Upon receipt of the packet, the AP 25 may determine whether the destination of the packet is associated with the AP 25, or whether the packet should be forwarded to a further AP within the mesh 45, as will be described below.

FIG. 5 shows an exemplary embodiment of a method 500 utilized by the AP 25 after it has received the packet. In step 505, the AP 25 receives the packet from the switch 15. In step 510, the AP 25 identifies the destination of the packet by, for example, looking at the third address field (e.g., the "remote destination") in the header 420. For example, the third address field may identify the MU 40. As described above, the header 420 on the packet is not encrypted, and thus, the AP 25 does not have to perform any decryption to identify any of the data therein.

In step 515, the AP 25 determines whether the destination (e.g., the MU 40) is associated therewith. In the exemplary embodiment shown in FIG. 1, the MU 40 is not associated with the AP 25, but with the AP 35. Thus, the method 500 proceeds to step 520, where the AP 25 identifies a transmission path for the packet as a function of the routing table 200. As described above, the switch 15 downloads the routing table 200 to each AP in the mesh 45. The downloading may occur at predetermined intervals (e.g., time-based) and/or anytime the routing table 200 is updated by the switch 15.

In one embodiment, the AP 25 identifies the second address in the second address field of the second header 420 to determine where the packet came from. The AP 25 looks up the second address in the first field 205 of the routing table 200. The AP 25 then determines the AP to which the packet should be transmitted in the second field 210, and optionally, which interface the AP 25 should utilize when transmitting the packet. For example, the AP 25 received the packet from the switch 15, and thus, should transmit it to the AP 35 using a first radio (e.g., on the 2.4 GHz band). During operation, the APs may accumulate statistics reflecting network communication (e.g., retries, failed transmissions, latency, congestion, etc.). When one or more of the statistics reach a predefined threshold, the statistics may be transmitted to the switch in a control packet. The switch may utilize the statistics to update and/or reconfigure the routing table.

In step 525, the AP 25 transmits the packet to the AP 35, which then executes the method 500. However, when the AP 35 reaches the step 515, it will determine that the MU 40 is associated therewith. Thus, if the MU 40 is in a wake mode, the packet will be transmitted thereto, as shown in step 530. However, if the MU 40 is in a power-save mode, the AP 35 may buffer the packet and wait until the MU 40 switches to the wake mode before transmitting the packet. The MU 40 may then decrypt the data portion of the packet.

Those of skill in the art will understand that the packet may be transmitted upstream (e.g., from the MU 40 toward the switch 15) in a similar manner. That is, the MU 40 may transmit the packet to the AP 35, which utilizes the routing table to forward the packet within the mesh 45 and/or to the switch 15.

As understood from the above description, the present invention provides for centralized routing determinations at the switch 15 and increased throughput because the APs may not perform any encryption/decryption on the packet. Thus, the APs within the mesh 45 may utilize only a single processor on each radio, and need not be equipped with a processor on the motherboard. Furthermore, the APs may not require any additional hardware and/or memory. Without having to perform encryption on the packet, the APs may utilize less power, thereby extending a life of the batteries utilized thereby.

It will also be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

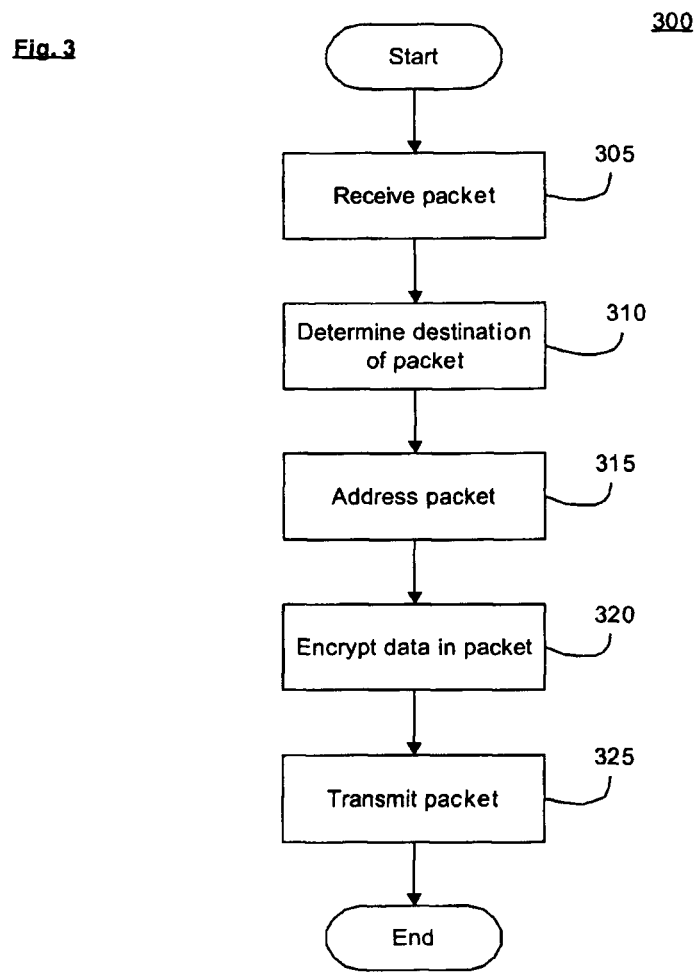

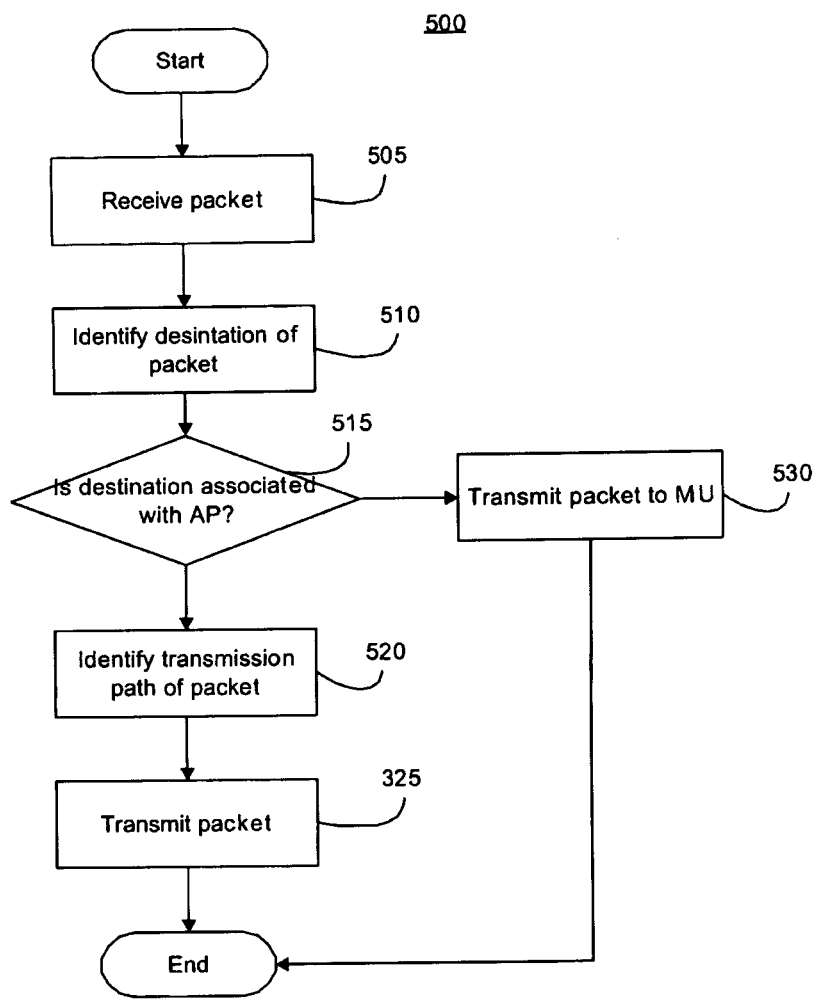

What is claimed is:

1. A method for data communication in a wireless mesh network, comprising:
    receiving a packet from a network switch by a first wireless device from a wired source device which is addressed to a destination wireless device, the first wireless device operable to communicate with the network switch via a wired connection and the destination wireless device via a wireless connection, the first wireless device configured to operate as a root node in a wireless mesh network and the destination wireless device configured to communicate with a mobile unit in the wireless mesh network, the first wireless device having access to a routing table including addressing data indicative of a packet transmission path in the wireless mesh network, the packet configured with a header that includes a first identifier associated with the first wireless device, a destination identifier associated with the destination wireless device, and a source identifier identifying the wired source of the packet;
    generating and updating the routing table for the wireless mesh network when the mesh network is modified;
    transmitting the routing table to all access points in the mesh network when the routing table is updated; and
    transmitting the packet by the first wireless device to the destination wireless device using the routing table.

2. The method according to claim 1, wherein the destination wireless device includes at least one of a barcode scanner, and a Radio Frequency Indentification device.

3. The method according to claim 1, wherein the packet is reformatted for a wireless communication protocol.

4. The method according to claim 3, wherein each identifier includes a Basic Service Set Identifier (BSSID).

5. The method according to claim 3, wherein the routing table further includes data indicative of a radio interface utilized by the each wireless device in the wireless communication link when transmitting the packet.

6. The method according to claim 5, wherein a data portion of the packet is encrypted and the packet header is unencrypted for transmission through the mesh network.

7. The method according to claim 1, wherein the first identifier is the source identifier.

8. The method according to claim 1, further comprising:
    updating the routing table at a predetermined time-based interval.

9. A network switch for data communication with a wireless mesh network, comprising:
    a memory storing a routing table, the routing table including addressing data indicative of a packet transmission path in the wireless mesh network;
    a network switch receiving a packet from a wired source device, the packet configured with a header that includes a first identifier associated with a first access point, a destination identifier associated with a destination access point, and a source identifier identifying the wired source of the packet, the network switch operable to 1) generate and update the routing table for the wireless mesh network when the mesh network is modified and 2) transmit the routing table to all the access points in the mesh network when the routing table is updated; and
    a processor determining an intermediate device for the packet as a function of at least one of (i) the routing table and (ii) a destination identifier of a destination access point, the intermediate device having an intermediate identifier, wherein the packet includes an encrypted data portion and an unencrypted header portion that contains the wired source identifier, the intermediate identifier, an identifier of the network switch, and the destination identifier.

10. The arrangement according to claim 9, wherein the processor encrypts the data portion.

11. The arrangement according to claim 10, wherein the processor replaces the header portion with a further header portion, the further header portion corresponding to a communication protocol utilized by the destination access point.

12. The arrangement according to claim 9, wherein the processor updates the routing table at a predetermined interval.

13. A system for data communication in a wireless mesh network comprising:
a network switch;
a wired second communication network in communication with the network switch; and
a wired source device in the wired second communication network operable to communicate with the network switch via a wired connection to provide a packet from a source to a first access point for a destination access point via a wireless connection, the first access point configured to operate as a root node in a wireless mesh network and the destination access point configured to communicate with a mobile unit in the wireless mesh network, wherein the network switch is operable to 1) generate and update a routing table for the wireless mesh network when the mesh network is modified and 2) transmit the routing table to all the access points in the mesh network when the routing table is updated, the routing table including addressing data for determining a transmission path for the packet to be transmitted to or from the wired second communication network through the mesh network, wherein the packet includes a header that includes a first identifier associated with the first access point, a destination identifier associated with the destination access point, and a source identifier identifying the wired source of the packet in the wired second communication network.

14. The system according to claim 13, wherein the mobile unit includes at least one of a barcode scanner, and a Radio Frequency Identification device.

15. The system according to claim 13, wherein the routing table provides an increased amount of bandwidth to the mobile unit.

16. The system according to claim 13, wherein the packet is reformatted for a wireless communication protocol.

17. The system according to claim 16, wherein each identifier includes at a Basic Service Set Identifier (BSSID).

18. The system according to claim 13, wherein a data portion of the packet is encrypted and the packet header is unencrypted for transmission through the mesh network.

19. The system according to claim 13, wherein the switch replaces on the packet a first header formatted for a wired communications protocol with a second header formatted for a wireless communications protocol.

20. The system of claim 13, wherein the network switch replaces the packet with a second packet having a header used in the wireless communication network, and wherein the data potion of the packet remains unchanged.

21. The system of claim 20, wherein the header includes more than two address fields and the header used in the wired second communication network includes two address fields.

* * * * *

UNITED STATES PATENT AND TRADEMARK OFFICE
CERTIFICATE OF CORRECTION

PATENT NO. : 8,204,039 B2
APPLICATION NO. : 11/290920
DATED : June 19, 2012
INVENTOR(S) : Beach et al.

It is certified that error appears in the above-identified patent and that said Letters Patent is hereby corrected as shown below:

Title Page, Item (75), under "Assignee", in Column 1, Line 1, delete "Holtsville" and insert -- Holtsville, NY (US) --, therefor.

Title Page, Item (52), under "U.S. Cl.", in Column 1, Line 1, delete "370/358;" and insert -- 370/328; --, therefor.

Title Page 2, Column 2, Lines 9-17, delete "Hui Li et al: "Comparison of ad hoc and centralized multihop routing" Wireless Personal Multimedia Communications, 2002. The 5th International Symposium on Oct. 27-30, 2002, Piscataway, NJ, USA, IEEE, vol. 2, Oct. 27, 2002, pp. 791-795, XP010619198 ISBN: 07/7803-7442-8.
Raniwala A et al: "Centralized Channel Assignment and Routing Algorithms for Multi-Channel Wireless Mesh Networks" Mobile Computing and Communications Review, ACM, New York, NY, US, vol. 8, No. 2, Apr. 2004, pp. 50-65, XP002406238 ISSN: 1091-1669.".

In Fig. 3, Sheet 3 of 4, insert Referral Tag -- 300 --, for the Figure as attached.

In Fig. 5, Sheet 4 of 4, insert Referral Tag -- 500 --, for the Figure as attached.

In Fig. 5, Sheet 4 of 4, for Tag "510", in Line 1, delete "desintation" and insert -- destination --, therefor.

In Column 6, Line 33, in Claim 2, delete "Indentification" and insert -- Identification --, therefor.

Signed and Sealed this
Eighth Day of January, 2013

David J. Kappos
*Director of the United States Patent and Trademark Office*